United States Patent
Ele et al.

(10) Patent No.: US 11,692,854 B2
(45) Date of Patent: Jul. 4, 2023

(54) OPTICAL POSITION ENCODER

(71) Applicant: ams Sensors Singapore Pte. Ltd., Singapore (SG)

(72) Inventors: Vijay Ele, Hyderabad (IN); Niwin Gnaniah, Hyderabad (IN)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/262,513

(22) PCT Filed: Aug. 29, 2019

(86) PCT No.: PCT/SG2019/050428
§ 371 (c)(1),
(2) Date: Jan. 22, 2021

(87) PCT Pub. No.: WO2020/046209
PCT Pub. Date: Mar. 5, 2020

(65) Prior Publication Data
US 2021/0293584 A1     Sep. 23, 2021

Related U.S. Application Data

(60) Provisional application No. 62/724,747, filed on Aug. 30, 2018.

(51) Int. Cl.
G01D 5/347     (2006.01)
(52) U.S. Cl.
CPC ....... *G01D 5/34776* (2013.01); *G01D 5/3473* (2013.01)

(58) Field of Classification Search
CPC .. G01D 5/347; G01D 5/3473; G01D 5/34746; G01D 5/34776
See application file for complete search history.

(56) References Cited

U.S. PATENT DOCUMENTS

| | | | |
|---|---|---|---|
| 4,320,293 A * | 3/1982 | Guretzky | G01D 5/34784 250/214 PR |
| 5,061,952 A | 10/1991 | Ogawa | |
| 5,666,236 A | 9/1997 | Bracken et al. | |
| 9,307,125 B2 * | 4/2016 | Katsumata | H04N 5/2252 |
| 2010/0171029 A1 | 7/2010 | Lee et al. | |

FOREIGN PATENT DOCUMENTS

JP     2007033100 A     2/2007

OTHER PUBLICATIONS

International Search Report and Written Opinion for Application No. PCT/SG2019/050428 dated Nov. 15, 2019 (14 pages).

* cited by examiner

*Primary Examiner* — Kevin K Pyo
(74) *Attorney, Agent, or Firm* — Michael Best & Friedrich LLP

(57) ABSTRACT

An optical encoder system is disclosed comprising a movable target arranged to provide a varying reflectance dependent on a position of the target within the system. An emitter is positioned on a first side of the target to illuminate the target and a sensor is positioned on the first side of the target to sense a reflectance from the target, wherein the sensed reflectance is dependent on the position of the target within the system. Also disclosed are a target and a sensor module for use in such a system, a device comprising such a system and a method of determining the position of a moving target using such a system.

16 Claims, 4 Drawing Sheets

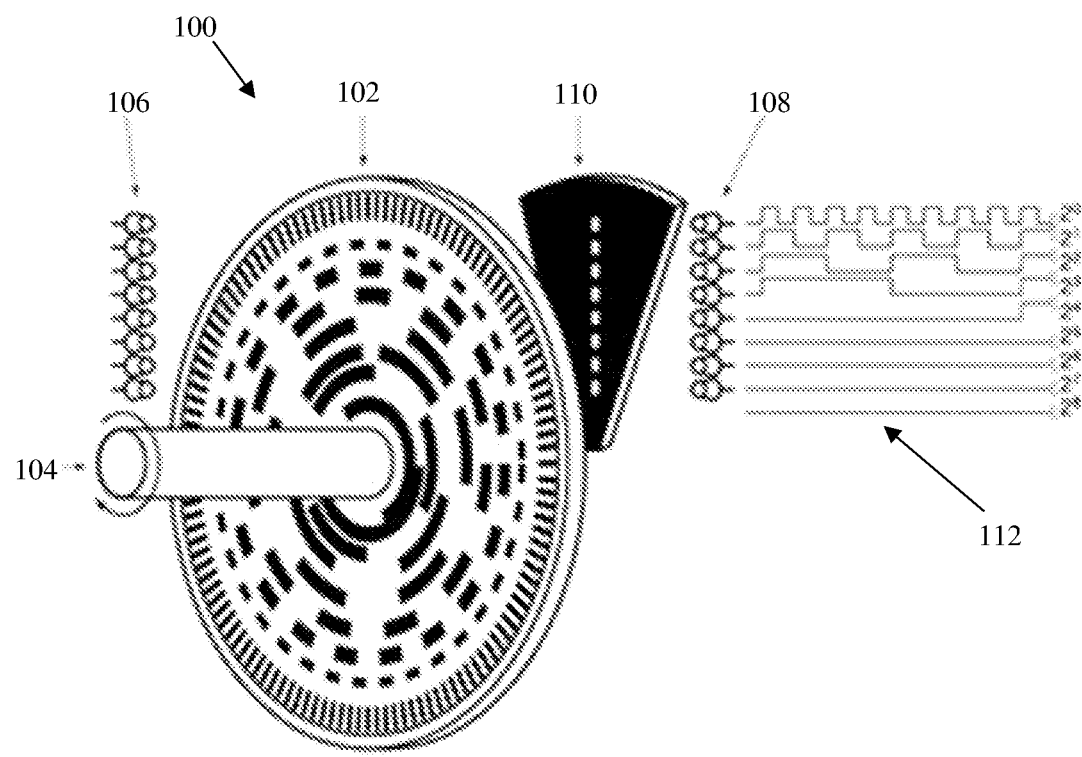
Figure 1 – PRIOR ART
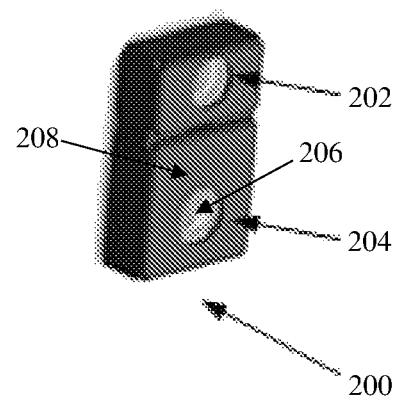
Figure 2

OPTICAL POSITION ENCODER

CROSS-REFERENCE TO RELATED APPLICATION

This application is the U.S. national stage entry, under 35 U.S.C. § 371, of International Application No. PCT/SG2019/050428, filed Aug. 28, 2019, which claims priority to U.S. Provisional Patent Application Ser. No. 62/724,747, filed on Aug. 30, 2018, the contents of which are incorporated herein by reference in their entirety.

TECHNICAL FIELD OF THE DISCLOSURE

The disclosure relates to an optical encoder, particularly but not exclusively, to an optical encoder system and a method of determining the position of a moving target using such a system.

BACKGROUND OF THE DISCLOSURE

The present disclosure relates to optical encoders, which are devices for measuring the position of a target by using the transmission of light to generate a digital signal that varies with the position of the target or other components which are fixed to or in connection with the target.

There are two types of mechanical configurations for optical encoders: rotary encoders and linear encoders. Rotary encoders are most commonly found in motion control systems while linear encoders are used more specifically for linear-positioning applications such as piston or actuator monitoring systems.

A rotary encoder uses optical sensing technology which relies on the rotation of a planar coded disc that has a pattern of opaque and transparent markings or lines on it. The disc is rotated by a shaft of circular cross-section such that a beam of light, from a light-emitting diode (LED) or the like, shines on an area of the disc and the markings on the disc act as shutters blocking and unblocking the light. A photodetector positioned on the opposite side of the disc to the light source, senses the alternating light beam when it passes through the disc apertures and converts the received light pattern into an electrical signal which is representative of an angular position of the disc at a particular point in time. The electrical signal may form the output of the encoder which may subsequently be used by a control system.

In the case of a linear encoder, the rotating shaft is replaced with a linearly moving component on which a similarly coded disc or strip is located, with a light source provided on one side and a photodetector provided on the opposite side for detection of light transmission through a portion of the strip.

An example of a known absolute position encoder 100 is illustrated in FIG. 1. This has a patterned disc 102 mounted on a rotating shaft 104 and includes an array of eight LEDs 106 provided on one side of the disc 102 and a corresponding array of eight photodetectors 108 provided on the opposite side of the disc 102. In this case, a fixed slit array 110 is provided between the disc 102 and the array of photodetectors 108 so that only light passing through the disc 102 and the fixed slit array 110 hits the photodetectors 108. In this arrangement, the eight LEDs 106 and photodetectors 108 can represent 8 bits such that the electrical signals generated by the photodetectors 108 on detection of light transmitted through the disc 102, form an eight bit binary output 112. Accordingly, the angular position of the disc 102 at any point in time can be determined based on the detected pattern of light that is transmitted through the disc 102.

Some problems associated with such known optical encoders are that they require N number of LEDs and photodetectors, where N is the number of bits encoded. This results in a large form factor and bill of materials, which in turn increases the cost of manufacture. In addition, any vibrations experienced by the components can result in a misalignment of one or more of the LEDs, disc, slits or photodetectors and this may give rise to errors in the electrical signals generated by the system It is therefore an aim of the present disclosure to provide an optical encoder that address one or more of the problems above or at least provides a useful alternative.

SUMMARY

In general, this disclosure proposes to overcome the above problems by measuring reflectance from a moving target instead of transmission of light through a moving target. This arrangement not only reduces the effect of any vibrations but also requires only a single emitter and photodetector, which are mounted on the same side of the target, thus, reducing the form factor, bill of materials and cost of manufacture.

According to one aspect of the present disclosure, there is provided an optical encoder system comprising:

a movable target arranged to provide a varying reflectance dependent on a position of the target within the system;

an emitter positioned on a first side of the target to illuminate the target; and a sensor positioned on the first side of the target to sense a reflectance from the target, wherein the sensed reflectance is dependent on the position of the target within the system.

Thus, embodiments of this disclosure provide an optical encoder system that is configured to measure a reflectance from a moveable target where the reflectance varies depending on a position (e.g. linear or angular) of the target within the system. Thus, a precise position of the target can be determined from a measurement of the reflectance at any point in time. Advantageously, the varying reflectance allows the position of the target to be determined as different positions will result in a different reflectance.

The sensed reflectance may be dependent on one or more of: a reflectivity, shape, configuration, pattern, colour, material or other feature of the target.

It should be understood that the term illuminate is used herein to denote the incidence of an emitted signal on the target. However, the emitted signal may or may not be a visible light signal. In some embodiments, the emitted signal may be an electromagnetic wave in a non-visible portion of the electromagnetic spectrum (e.g. an infra-red IR or ultra-violet UV signal).

The target may be arranged such that at least a portion is provided at a fixed distance from the sensor during operation. However, it will be understood that said portion will be dependent on the position of the target within the system at any point in time. For example, a first portion may be provided at a fixed distance from the sensor during a first operation and a second, different, portion may be provided at a fixed distance from the sensor during a second operation.

The target may be configured to provide a continuously varying reflectance (e.g. a linearly varying reflectance) or a discretely varying (e.g. discontinuously varying) reflectance.

The target may be configured for linear movement or rotational movement.

The target may have at least one dimension substantially similar to at least one dimension of a field of view of the sensor.

The target may comprise one or more of: a pattern, shape or configuration arranged to provide the varying reflectance.

The target may comprise one or more openings or gaps arranged to provide the varying reflectance.

The system may further comprise an analogue to digital converter (ADC) configured to convert the sensed reflectance into a digital signal for processing.

The system may further comprise a processor configured to map the sensed reflectance to a position of the target. The processor may be incorporated into a sensor module along with the sensor or may be provided separately, for example, in a control device. Where the processor is separate from the sensor the sensor may be configured to transmit a signal representative of the sensed reflectance, to the processor.

The system may be calibrated such that a minimum reflectance (e.g. zero photons detected or an ADC count of zero) corresponds to a first position of the target, a maximum reflectance (e.g. maximum photons detected or an ADC maximum count) corresponds to a second position of the target, and positions between the first and second positions may be determined based on an amount of reflectance measured between the minimum and maximum reflectance.

The emitter may comprise a light source such as a light-emitting diode (LED), a vertical cavity surface emitting laser (VCSEL) or other laser.

The sensor may comprise a single photon avalanche diode (SPAD) or other photodiode.

The emitter may be configured to provide infrared radiation (IR) and the sensor may be configured to sense infrared radiation (IR).

The target may be in the form of a strip, disc or cylinder (e.g. a wheel). In some embodiments the first side of the target may an outside of a cylinder and in other embodiments the first side of the target may be an inside of a cylinder.

According to a second aspect of this disclosure, there is provided a movable target for use in the system above, the target having a varying reflectance dependent on a position of the target within the system.

According to a third aspect of this disclosure, there is provided a sensor module for use in the system above, the sensor module may comprise a sensor configured to sense a reflectance from a target, wherein the sensed reflectance is dependent on a position of the target within the system, and a processor configured to map the sensed reflectance to a position of the target.

According to a fourth aspect of this disclosure, there is provided a device comprising an optical encoder system as described above.

According to a fifth aspect of this disclosure, there is provided a method of determining the position of a moving target comprising:
providing an optical encoder system as described above;
moving the target to a position to be determined;
illuminating the target; and
sensing a reflectance from the target, wherein the sensed reflectance is dependent on the position of the target within the system.

Embodiments of the disclosure may employ ambient light cancellation and/or cross-talk cancellation techniques.

Prior art optical encoders require targets incorporating a pattern of apertures configured to allow light transmission between multiple pairs of emitters and photodetectors in order to extract a position of the target. This requires the emitters and photodetectors to be provided on separate component boards on either side of the target making the encoder bulky and complex in construction.

Compared to such known systems, the present optical encoder system disclosed here has the following advantages:
1. Lower system cost as only one emitter and sensor is required, not one for each number of bits, as in the prior art.
2. Lower form factor as fewer components are required making the system compact.
3. Both the emitter and sensor can be incorporated in a single package/board, simplifying construction.
4. Scalable accuracy with low cost as all that is required is an appropriate calibration of the reflectance with position.
5. No performance degradation due to vibration or wobbling as emitter, target and sensor alignment is much less critical to performance.

Finally, the present optical encoder system disclosed here utilises a novel approach in that it relies on reflectance from, rather than transmission through, a target.

BRIEF DESCRIPTION OF THE PREFERRED EMBODIMENTS

Some embodiments of the disclosure will now be described by way of example only and with reference to the accompanying drawings, in which:

FIG. 2 shows an optical encoder device in accordance with the present disclosure;

DETAILED DESCRIPTION OF THE PREFERRED EMBODIMENTS

Figure 3A:
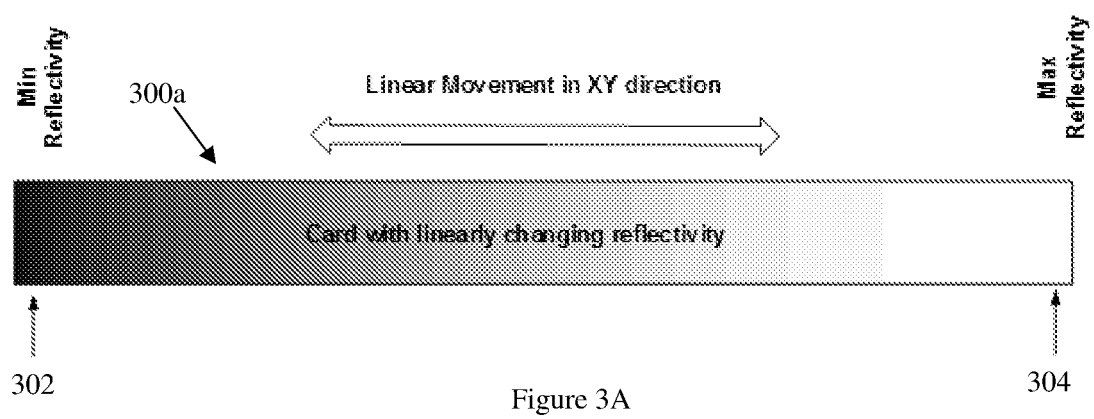
FIG. 3A shows a target strip in accordance with the present disclosure.

Generally speaking, the disclosure provides a low cost optical encoder solution which relies on a measured reflectance from a moving target to determine a position of the target.

Some examples of the solution are given in the accompanying figures.

FIG. 2 shows an optical encoder device 200 in accordance with the present disclosure. The optical encoder device 200 comprises an emitter 202 in the form of an IR VCSEL and a sensor module 204. The sensor module 204 comprises a sensor 206 in the form of an IR SPAD, signal-conditioning circuitry (not shown) and a processor 208.

In use, the emitter 202 is configured to be provided on a first side of the target to illuminate the target and the sensor 206 is configured to also be provided on the first side of the target to sense a reflectance from the target, wherein the sensed reflectance is dependent on the position of the target within the system.

In other embodiments, the signal-conditioning circuitry and/or processor 208 may be provided in a separate component, e.g. a control device, in communication with the sensor 206.

Furthermore, in other embodiments, the emitter 202 and sensor 206 may be provided as separate components.

The optical encoder device 200 is configured to be employed in an optical encoder system including a moveable target arranged to provide a varying reflectance dependent on a position of the target within the system. Some examples of targets which may be employed with the optical encoder device 200 are shown in FIGS. 3A through 5B and described below.

FIG. 3A shows a target strip 300a in accordance with the present disclosure. The target strip 300a is a rectangular strip of card having a continuously linearly varying reflectivity along its length from a minimum reflectivity 302 to a maximum reflectivity 304. The reflectivity is varied by a gradual changing gradient from black (minimum reflectivity 302 or maximum absorbance) to white (maximum reflectivity 304 or minimum absorbance) along the length of the strip 300a. However, the precise nature of the varying reflectivity may be dependent on the wavelength of the incident light from the emitter 202.

As shown in FIG. 3A, the target strip 300a has a length which is significantly longer than its height. The height of the target strip 300a will be chosen to match or slightly exceed the height of the field of view (FOV) of the sensor 206. Notably, in this embodiment, the reflectivity does not vary across the height of the target strip 300a. The length of the target strip 300a greatly exceeds a corresponding length of the field of view (FOV) of the sensor 206 to ensure the reflectance in sensor's field of view changes when the target strip 300a is moved left or right, as illustrated. In some embodiments, a filter or slit may be provided to shield some of the target strip 300a so that the reflectance observed by the sensor 206 comes from only a narrow vertical slit on the target strip 300a. This will ensure accuracy when the reflectance is mapped to a position of the target strip 300a. Furthermore, the target strip 300a will be arranged such that at least a portion (i.e. the portion in the sensor's FOV which is visible through the slit) is provided at a fixed distance (i.e. in a Z direction) from the sensor 206 during operation. This ensures that the reflectance measured at the sensor 206 is dependent only on the reflectivity of the portion of the target strip 300a that is visible and not on the distance between the target strip 300a and the sensor 206.

In use, the target strip 300a will be arranged for linear reciprocal movement in the XY direction shown (i.e. to the left and right when viewed from the sensor 206). Accordingly, the target strip 300a and optical encoder device 200 together will form a linear optical encoder system in accordance with this disclosure.

Figure 3B:
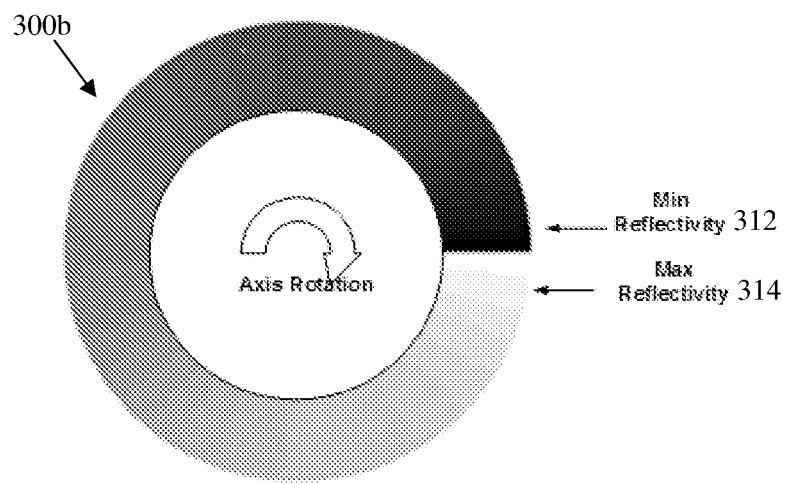
FIG. 3B shows a target disc in accordance with the present disclosure.

FIG. 3B shows a target disc 300b in accordance with another embodiment of the present disclosure. The target disc 300b is similar to that of the target strip 300a except it is configured as a planar circular ring with the ends of the strip abutting such that there is a point of intersection between a region of minimum reflectivity 312 and a region of maximum reflectivity 314. In this case the target disc 300b is arranged for rotation in a plane around a central axis and the sensor 206 will be mounted above the target disc 300b with a FOV extending radially along a portion of the ring. Accordingly, the target disc 300b and optical encoder device 200 together will form a rotary optical encoder system in accordance with this disclosure.

Figure 3C:
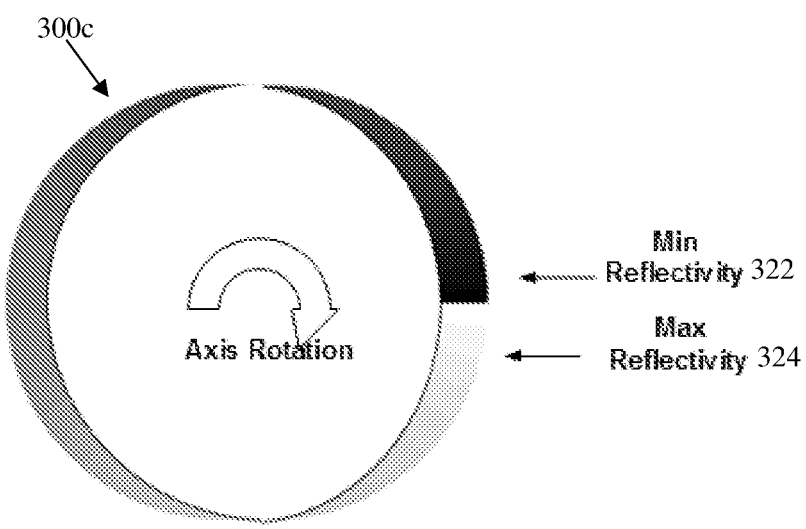
FIG. 3C shows a target cylinder in accordance with the present disclosure.

FIG. 3C shows a target cylinder 300c in accordance with an embodiment of the present disclosure. The target cylinder 300c is similar to that of the target strip 300a except it is configured as an upstanding circular ring or wheel with the ends of the strip abutting such that there is a point of intersection between a region of minimum reflectivity 322 and a region of maximum reflectivity 324. In this case, FIG. 3C is not a true representation of the target cylinder 300c but is illustrative only. In reality, the target cylinder 300c will have a varying reflectivity around its outer cylindrical wall and the sensor 206 will be positioned outside of the target cylinder 300c directed towards a longitudinal strip of the outer cylindrical wall. In other embodiments, the target cylinder 300c may have a varying reflectivity around its inner cylindrical wall and the sensor 206 may be positioned inside of the target cylinder 300c directed towards a longitudinal strip of the inner cylindrical wall.

In this case the target cylinder 300c is arranged for rotation around a central longitudinal axis such that the target cylinder 300c and optical encoder device 200 together will form a rotary optical encoder system in accordance with this disclosure.

Figure 4:
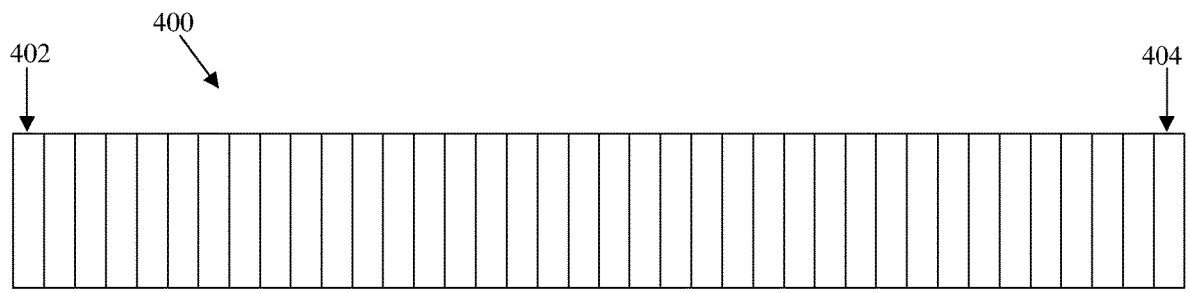
FIG. 4 shows a discrete target strip in accordance with the present disclosure.

FIG. 4 shows a discrete target strip 400 in accordance with an embodiment of the present disclosure. This is illustrative only as the varying reflectivity of the discrete target strip 400 is not indicated visually. However, the discrete target strip 400 is a rectangular strip of card having a discretely (e.g. discontinuously) varying reflectivity along its length from a minimum reflectivity 402 to a maximum reflectivity 404. The reflectivity in this case is varied in a discrete step-wise fashion from an area of relatively low reflectivity to an adjacent area of relatively higher reflectivity and this is repeated multiple times along the length of the strip 400 as indicated by the demarked areas in FIG. 4. For example, the minimum reflectivity 402 may be 0% and the adjacent reflectivity may be 5%, followed by consecutive areas of 10%, 15%, 20%, 25%, 30%, 35%, 40%, 45%, 50%, 55%, 60%, 65%, 70%, 75%, 80%, 85%, 90%, 95% up to the maximum reflectivity 404 of 100%. In other embodiments, the difference between adjacent areas of reflectivity may be a different percentage (e.g. 1%, 2%, 3%, 10%). It will be understood that the accuracy of this embodiment may be dependent on the width of each area of reflectivity and/or the percentage change in reflectivity between adjacent areas. Thus, use of a discrete target strip 400 such as that illustrated may not be as accurate as a continuously varying target strip 400 but this may not be critical for some embodiments.

Although the discrete target strip 400 in FIG. 4 is configured for linear reciprocal movement, a similar discretely varying reflectivity could be employed in a rotary encoder for example by adapting the target disc 300b of FIG. 3B or the target cylinder 300c of FIG. 3C.

Figure 5A:
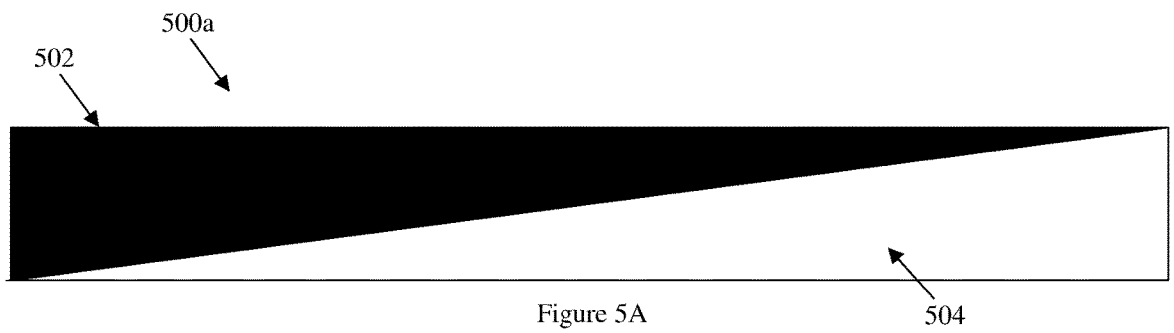
FIG. 5A shows a reflectance area-changing target strip in accordance with the present disclosure.

FIG. 5A shows a reflectance area-changing target strip 500a in accordance with an embodiment of the present disclosure. In this example, the target strip 500a is similar to that of FIG. 3A, however, instead of the entire strip having a continuously varying reflectivity resulting from the extent of shading along the length of the strip, this target strip 500a employs only two different reflectivities (represented as a black minimum reflectivity area 502 and a white maximum reflectivity area 504, although any other contrasting reflectivities could be used). In order to introduce a different reflectance value at the sensor 206, the shape (i.e. area) of each of the two reflectivity portions varies continuously along the length of the strip 500a. This is facilitated in this embodiment by the strip 500a being split in half diagonally along its length with the two reflectivities being provided on opposite sides of the diagonal such that the proportion of light reflected depends on the position of the sensor 206 FOV in relation to the diagonal.

Although the reflectance area-changing target strip 500a in FIG. 5A is configured for linear reciprocal movement, a similar area-changing reflectance could be employed in a rotary encoder for example by adapting the target disc 300b of FIG. 3B or the target cylinder 300c of FIG. 3C.

Figure 5B:
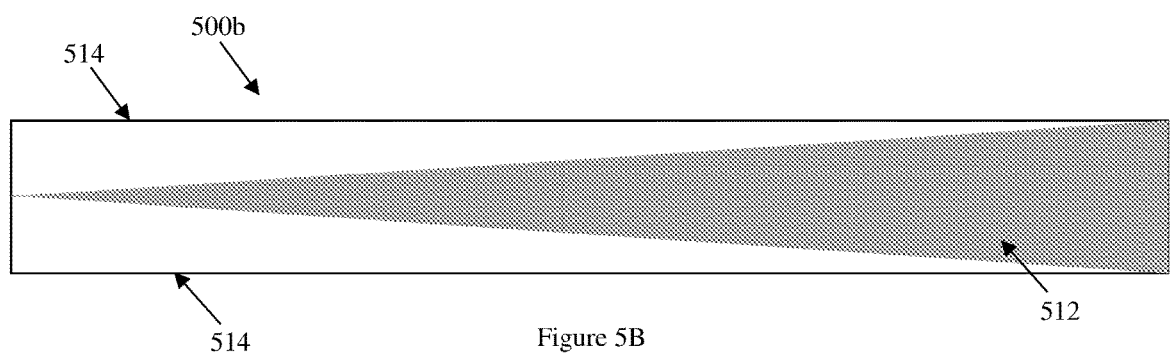
FIG. 5B shows a transmission area-changing target strip in accordance with the present disclosure.

FIG. 5B shows a transmission area-changing target strip 500b in accordance with another embodiment of the present disclosure. In this example, the target strip 500b is similar to that of FIG. 5A, however, instead of employing two different reflectivities, only one white maximum reflectivity area 514 is used in this case, in combination with a cut-out or opening to form a transmission area 512 (shown in grey for ease of illustration only). In other embodiments, a different reflectivity could be employed. However, in order to introduce a different reflectance value at the sensor 206, the shape (i.e. area) of the maximum reflectivity area 514 varies continuously along the length of the strip 500b. This is facilitated in this embodiment by the strip 500b having an isosceles triangular cut-out from a central tip at one side of the strip 500b to a base along the opposite side of the strip 500b. This ensures that the proportion of light reflected depends on the position of the sensor 206 FOV in relation to the transmission area 512. Note, although this embodiment allows for transmission of light through the strip 500b it is only the light reflected from the strip 500b that is measured by the sensor 206. There is no need for a sensor behind the strip 500b as there is no need to measure the transmitted light.

Although the transmission area-changing target strip 500b in FIG. 5B is configured for linear reciprocal movement, a similar area-changing transmission could be employed in a rotary encoder for example by adapting the target disc 300b of FIG. 3B or the target cylinder 300c of FIG. 3C.

It should be noted that in other embodiments, the transmission area 512 may be replaced with a contrasting reflectance area similar to that of FIG. 5A. Furthermore, one of the two reflectivities in FIG. 5A could be replaced by a transmission area or cut-out similar to that in FIG. 5B.

Other forms of target are also possible within the scope of this disclosure as long as the target is configured to produce a varying gradient of reflectance depending on a position/location of the target within the system (i.e. with respect to the sensor 206 FOV).

Figure 6:
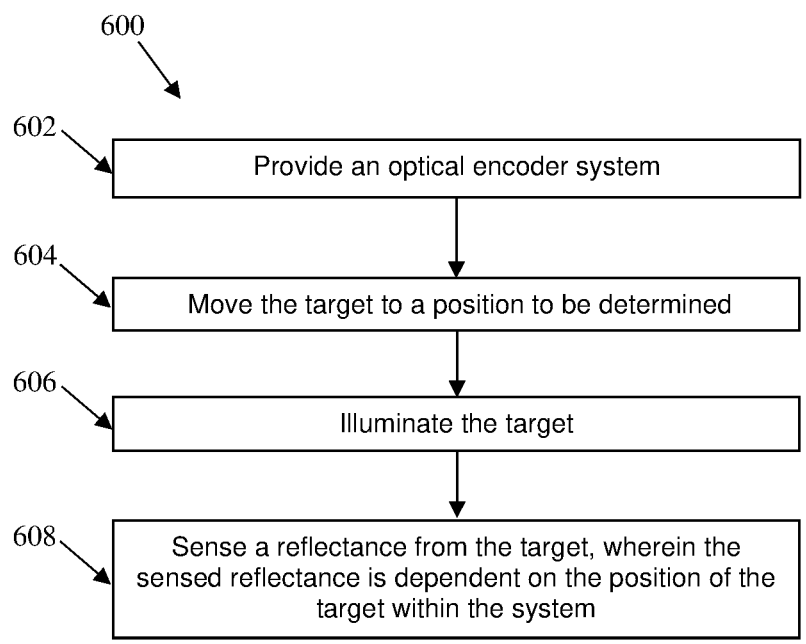
FIG. 6 illustrates an exemplary flow diagram outlining the steps of a method of determining the position of a moving target in accordance with embodiments of this disclosure.

FIG. 6 illustrates an exemplary flow diagram outlining the steps of a method 600 of determining the position of a moving target in accordance with embodiments of this disclosure. The method 600 comprises a first step 602 of providing an optical encoder system; a second step 604 of moving the target to a position to be determined; a third step 606 of illuminating the target; and a fourth step 608 of sensing a reflectance from the target.

Embodiments of the present disclosure can be employed in many different applications including position and/or proximity sensors, for example, in automotive, manufacturing and other industries.

LIST OF REFERENCE NUMERALS 100 prior art absolute position encoder
102 patterned disc
104 shaft
106 LEDs
108 photodetectors
110 fixed slit array
112 binary output
200 optical encoder device
202 emitter
204 sensor module
206 sensor
208 processor
300a target strip
302 minimum reflectivity
304 maximum reflectivity
300b target disc
312 minimum reflectivity
314 maximum reflectivity
300c target cylinder
322 minimum reflectivity
324 maximum reflectivity
400 discrete target strip
402 minimum reflectivity
404 maximum reflectivity
500a reflectance area-changing target strip
502 minimum reflectivity area
504 maximum reflectivity area
500b transmission area-changing target strip
512 transmission area
514 maximum reflectivity area
600 method of determining the position of a moving target
602 step 1: provide an optical encoder system
604 step 2: move the target to a position to be determined
606 step 3: illuminate the target
608 step 4: sense a reflectance from the target The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. An optical encoder system comprising:
a movable target including a series of abutting sections, wherein the abutting sections comprise a first section with a lowest reflectivity and a second section with a highest reflectivity, and wherein the series of abutting sections are arranged such that the reflectivity of each section increases from the first section to the second section to thereby provide a discretely varying reflectance that linearly increases in a step-wise fashion from the first section to the second section and that is dependent on a position of the target within the system, wherein the target includes one or more openings or gaps arranged to provide the varying reflectance;
an emitter positioned on a first side of the target to illuminate the target; and a sensor positioned on the first side of the target to sense a reflectance from the target, wherein the sensed reflectance is dependent on the position of the target within the system.

2. The system according to claim 1, wherein the target is arranged such that at least a portion is provided at a fixed distance from the sensor during operation.

3. The system according to claim 1, wherein the target is configured for linear movement.

4. The system according to claim 1, wherein the target is configured for rotational movement.

5. The system according to claim 1, wherein the target has at least one dimension substantially similar to at least one dimension of a field of view of the sensor.

6. The system according to claim 1, wherein the target comprises one or more of: a pattern, shape or configuration arranged to provide the varying reflectance.

7. The system according to claim 1, further comprising an analogue to digital converter (ADC) configured to convert the sensed reflectance into a digital signal for processing.

8. The system according to claim 1, further comprising a processor configured to map the sensed reflectance to a position of the target.

9. The system according to claim 1, wherein the emitter comprises a light-emitting diode (LED) or, a vertical cavity surface emitting laser (VCSEL).

10. The system according to claim 1, wherein the sensor comprises a single photon avalanche diode (SPAD).

11. The system according to claim 1, wherein the emitter is configured to provide infrared radiation (IR) and the sensor is configured to sense infrared radiation (IR).

12. The system according to claim 1, wherein the target is in the form of a strip, disc or cylinder.

13. A movable target for use with the system of claim 1, the moveable target including a series of abutting sections, wherein the abutting sections comprise a first section with a lowest reflectivity and a second section with a highest reflectivity, and wherein the series of abutting sections are arranged such that the reflectivity of each section increases from the first section to the second section are to thereby provide a discretely varying reflectance that linearly increases in a step-wise fashion from the first section to the second section and that is dependent on a position of the target within the system, the movable target for use with the system further comprising one or more openings or gaps arranged to provide the varying reflectance.

14. A sensor module for use in the system according to claim 1, the sensor module comprising a sensor configured to sense a reflectance from a target, the target including a series of abutting sections, wherein the abutting sections include a first section with a lowest reflectivity and a second section with a highest reflectivity, and wherein the series of abutting sections are arranged such that the reflectivity of each section increases from the first section to the second section are to thereby provide a discretely varying reflectance that linearly increase in a step-wise fashion from the first section to the second section and that is dependent on a position of the target within the system, such that the sensed reflectance is dependent on a position of the target within the system, and a processor configured to map the sensed reflectance to a position of the target.

15. A device comprising an optical encoder system according to claim 1.

16. A method of determining the position of a moving target comprising:
providing an optical encoder system according to claim 1;
moving the target to a position to be determined;
illuminating the target; and
sensing a reflectance from the target, wherein the sensed reflectance is dependent on the position of the target within the system.

* * * * *